United States Patent Office 3,429,825
Patented Feb. 25, 1969

3,429,825
WATER SOLUBLE DAYLIGHT FLUORESCENT PIGMENT AND COMPOSITION
Robert W. Voedisch, Morton Grove, Ill., assignor to Lawter Chemicals, Inc., Chicago, Ill., a corporation of Delaware
No Drawing. Filed Jan. 6, 1966, Ser. No. 519,011
U.S. Cl. 252—301.2     10 Claims
Int. Cl. C09k *1/02;* C08g *9/24, 51/14*

This invention relates to daylight fluorescent materials and more particularly to a water soluble pigment embodying daylight fluorescent dyestuff in a dissolved state sufficient for release of fluorescigenous energy and to aqueous compositions containing same.

To the present, daylight fluorescent dye pigments have been formulated of daylight fluorescent dyestuffs embodied in a dissolved state in resinous systems wherein the resinous polymers are of the type that are water insoluble and preferably insoluble in organic solvents employed in paint or printing ink compositions: In the Kazenas Patents No. 2,809,957 and No. 2,938,383, and in the D'Alelio et al. Reissue Patent No. 25,845, description is made of the fabrication of daylight fluoroescent pigments in which the daylight fluorescent dyestuffs are embodied in a resinous system formulated of an aryl sulfonamide-aldehyde, triazine-aldehyde resin which is reacted to an advanced stage of polymeric growth for increasing the melting point range of the resin. The material is reduced to a finely divided state by grinding and incorporation into a suitable vehicle for a printing ink composition or paint.

Such daylght fluorescent pigments find excellent use in printing ink or paint compositions but they exhibit very little fluorescent effect when distributed with cellulosic fibers and the like fibrous systems formed into aqueous slurries for use in making colored papers having daylight fluorescent properties. It appears that the described daylight fluorescent pigments retain their separate particulate state in the aqueous system to constitute dispersed particles with the fibers in the paper article that is formed. As a result, the bright dalyight fluorescent color developed when the pigment is wet out with a suitable ink or paint carrier is incapable of development in fibrous systems of the type described.

It has been found, in accordance with the practice of this invention, that paper products and other fibrous fabrics having strong daylight fluorescent colors can be produced when the daylight fluorescent dyestuff is incorporated in the aqueous slurry for admixture with the fibrous system when use is made of a water soluble pigment formulated of a water soluble resin containing the daylight fluorescent dyestuff in a dissolved state.

Thus it is an object of this invention to produce and to provide a method for producing a water soluble daylight fluorescent pigment and it is a related obbject to produce a paper product having daylight fluorescent colors which grow bright in response to activation by light and to produce compositions for use in the manufacture of same.

It has been found that not all water soluble resinous, polymeric or high molecular weight materials are capable of use in combination with daylight fluorescent dyestuffs for release of their fluorescigenous energy essential for fluorescence. Such water soluble resinous materials are thus incapable of use with the daylight fluorescent dyestuffs in the manufacture of water soluble daylight fluorescent pigment. In fact, it has been found that water soluble resinous materials capable of use in the practice of this invention are very limited in character such as to exclude most of the more popular and well known resinous or polymeric systems. One resinous system, which can be used successfully with daylight fluorescent dyestuffs in the preparation of water soluble daylight fluorescent pigments, will hereinafter be referred to as a hydantoin-formaldehyde resin, as represented by dimethyl hydantoin-formaldehyde resin which can be prepared in accordance with the following example:

Example 1

|   | Parts by weight |
|---|---|
| Dimethyl hydanton | 100 |
| Para-formaldehyde | 32 |
| Water | 30 |
| Sodium hydroxide | 0.5 |

The foregoing materials when mixed together and heated will form into a resinous system ranging from a viscous liquid, through a soft mass to a hard brittle solid, depending upon the temperature and the amount of heating. A suitable hard resinous material adapted for use in pigment formation can be prepared by heating to a temperature of 300° F. and holding the materials at that temperature for about 2 hours.

Other hydantoin-aldehyde resins of the type described in U.S. Patent No. 2,155,863 can be employed, reference being made to the aforementioned patent for the formulation of such resins and the methods for manufacture.

Another somewhat related resinous system which I have found to be capable of use in the prepartion of a water soluble daylight fluorescent pigment of the type described can be referred to as the cyanuric-aldehyde resins, as represented by cyanuric acid-formaldehyde resin prepared in accordance with the following example:

Example 2

|   | Parts by weight |
|---|---|
| Cyanuric acid | 125 |
| Para-formaldehyde | 45 |
| Water | 160 |

The materials are combined and heated to a temperature of 200° F. for one hour and then the temperature is gradually raised to 280° F. to produce a resin which is hard and friable at ambient temperature.

Reference can be made to the German Patent No. 924,241 for other cyanuric-aldehyde resins and the methods for manufacture of same. Such other resins can be used, in accordance with the practice of this invention, in the manufacture of daylight fluorescent pigments.

The following examples of pigment prepartion are given by way of illustration, but not by way of limitation, being understood that others of the daylight dyestuffs, such as described in the aforementioned Kazenas and D'Alelio et al. patents, can be used.

Example 3

|   | Parts by weight |
|---|---|
| Dimethylhydantoin-formaldehyde resin of Example 1 | 100 |
| Rhodamine BX | 2 |

Example 4

|   | Parts by weight |
|---|---|
| Cyanuric-formaldehyde resin of Example 2 | 100 |
| Rhodamine BX | 1.5 |
| Rhodamine 7G | 1.0 |
| Brilliant Yellow 6G base | 2.0 |

Example 5

|   | Parts by weight |
|---|---|
| Dimethyl hydantoin-formaldehyde resin | 100 |
| Brillant Yellow 6G base | 2.0 |

The resins of Examples 3, 4 or 5 are reduced to a molten state at a temperature within the range of 250°–300° F. and the dyestuff component is added and dissolved in the molten resinous material. The mass is allowed to cool to about ambient temperature and then pulverized to relatively fine particles for use as a pigment.

In the manufacture of a colored daylight fluorescent tissue paper, wrapping paper or the like, the pigment is dissolved in the desired amount in an aqueous medium forming a part of the slurry in which the fibrous component is suspended whereby the daylight fluorescent dyestuff and resin are joined to the fibers in the dissolved state in the paper that is formed to produce a colored paper product which is characterized by a bright daylight fluorescence.

Similarly, the water soluble daylight fluorescent pigment can be dissolved in an aqueous medium for combination with textile fibers for use in the production of strands, yarns, cords and fabrics, in which the daylight fluorescent characteristics of the daylight fluorescent dyestuffs become capable of fuller development to produce textile fibers and fabrics having improved daylight fluorescent characteristics.

It will be apparent from the foregoing that I have provided new and improved daylight fluorescent compositions based upon the preparation of water soluble daylight fluorescent pigments whereby the daylight fluorescent dyestuffs are made available in a dissolved state for combination with fibrous systems and for other uses.

It will be understood that changes may be made in the details of formulation and compositions without departing from the spirit of the invention, especially as defined in the following claims.

I claim:
1. A water soluble dylight fluorescent pigment comprising finely divided particles of a water soluble hydantoin-aldehyde polymerized resin and a daylight fluorescent dyestuff dissolved in the resin.

2. A water soluble daylight fluorescent pigment as claimed in claim 1 in which the hydantoin-aldehyde polymerized resin is a dimethyl hydantoin-formaldehyde resin.

3. A water soluble daylight fluorescent pigment comprising finely divided particles of a water soluble cyanuric-aldehyde resin and a daylight fluorescent dyestuff dissolved in the resin.

4. A water soluble daylight fluorescent pigment as claimed in claim 3 in which the cyanuric-aldehyde resin is a cyanuric-formaldehyde resin.

5. A composition for the manufacture of fibrous products having a daylight fluorescent color brightness comprising an aqueous system, fibers forming the fibrous product dispersed in the aqueous system and a water soluble daylight fluorescent pigment dissolved in the aqueous system in which the daylight fluorescent pigment comprises a water soluble hydantoin-aldehyde resin and a daylight fluorescent dyestuff in a dissolved state in the resin.

6. A composition as claimed in claim 5 in which the hydantoin-aldehyde resin comprises dimethyl hydantoin-formaldehyde resin.

7. A composition for the manufacture of fibrous products having daylight fluorescent color brightness comprising an aqueous system, a water soluble daylight fluorescent pigment dissolved in the aqueous system in which the daylight fluorescent pigment comprises a water soluble cyanuric acid-aldehyde resin and a daylight fluorescent dyestuff in a dissolved state in the resin and in which the fibers are wet with the aqueous system.

8. A fibrous fabric having daylight fluorescent color in which the fabric comprises fibers wet with a water soluble hydantoin-aldehyde resin containing a daylight fluorescent dyestuff in a dissolved state therein.

9. A fibrous fabric as claimed in claim 8 in which the hydantoin-aldehyde resin is a dimethyl hydantoin-formaldehyde resin.

10. A fibrous fabric having daylight fluorescent color in which the fabric comprises fibers wet with a water soluble cyanuric acid-aldehyde resin having a daylight fluorescent dyestuff in a dissolved state therein.

References Cited

UNITED STATES PATENTS

| | | | |
|---|---|---|---|
| Re. 25,845 | 8/1965 | D'Alelio et al. | 252—301.2 |
| 2,197,357 | 4/1940 | Widmer et al. | 252—301.2 X |
| 3,076,020 | 1/1963 | Stilz et al. | 162—162 X |
| 3,211,665 | 10/1965 | Allen et al. | 252—301.2 |
| 3,258,392 | 6/1966 | Brill et al. | 162—162 |

HELEN M. McCARTHY, *Primary Examiner.*

P. F. SHAVER, *Assistant Examiner.*

U.S. Cl. X.R.

162—162; 117—33.5; 260—37, 67.5